United States Patent [19]

Haas et al.

[11] Patent Number: 5,029,200
[45] Date of Patent: Jul. 2, 1991

[54] VOICE MESSAGE SYSTEM USING SYNTHETIC SPEECH

[75] Inventors: Lawrence J. Haas, Broomfield; Garry D. Kepley, Boulder; Frank C. Liu, Denver, all of Colo.

[73] Assignee: AT&T Bell Laboratories, Murray Hill, N.J.

[21] Appl. No.: 346,045

[22] Filed: May 2, 1989

[51] Int. Cl.$^5$ .................. H04M 1/57; H04M 3/50
[52] U.S. Cl. .................. 379/89; 379/142; 379/207; 379/396
[58] Field of Search .............. 379/89, 88, 67, 142, 379/207, 201, 396; 381/51, 52

[56] References Cited

U.S. PATENT DOCUMENTS

| | | | |
|---|---|---|---|
| 4,646,346 | 2/1987 | Emerson et al. | 379/214 |
| 4,790,003 | 12/1988 | Kepley et al. | 379/88 |
| 4,935,954 | 6/1990 | Thompson et al. | 379/89 |

OTHER PUBLICATIONS

"The Telephone-The Ultimate Terminal", G. F. Grover, *Telephony*, Jun. 4, 1984, pp. 34, 35, 37, 40.
"Merlin Voice Mail VM600", C. R. Newson, *British Telecommunications Engineering*, vol. 4, Apr. 1985, pp. 32–35.

*Primary Examiner*—Thomas W. Brown
*Attorney, Agent, or Firm*—John A. Caccuro

[57] ABSTRACT

A voice message service system stores subscriber-specific voice phrases (e.g., names) using digitally encoded phonemes while common system voice phrases are stored using digitally encoded voice samples. System voice announcements are formed by combining selected common system voice phrases with selected subscriber-specific voice phrases generated from phonemes. When a voice mail message is sent from one message system to another message system, the sender's identification is sent using digitally encoded phonemes in the message header. The destination message system uses the received digitally encoded phonemes to generate the sender's identification as a synthetic voice signal.

22 Claims, 5 Drawing Sheets

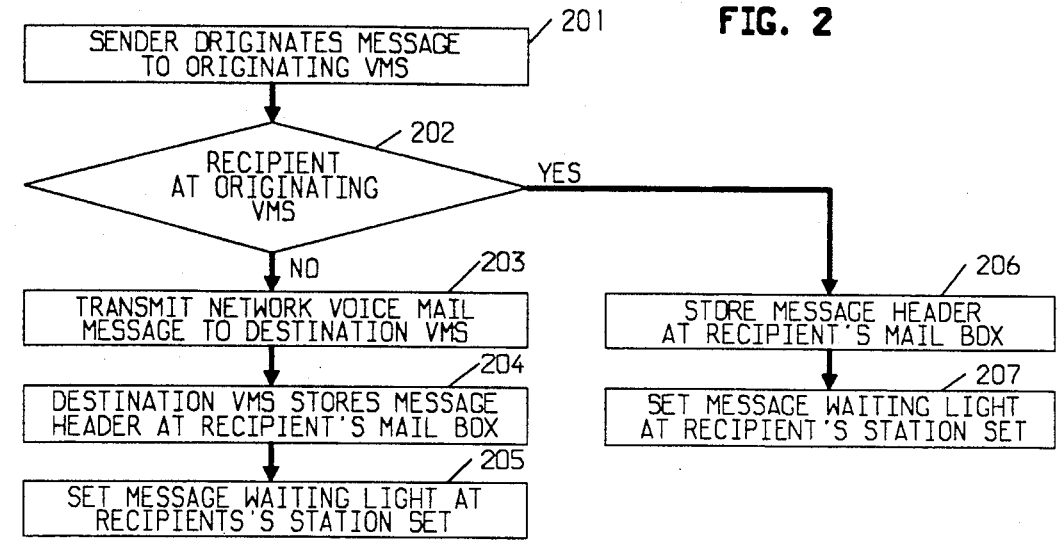
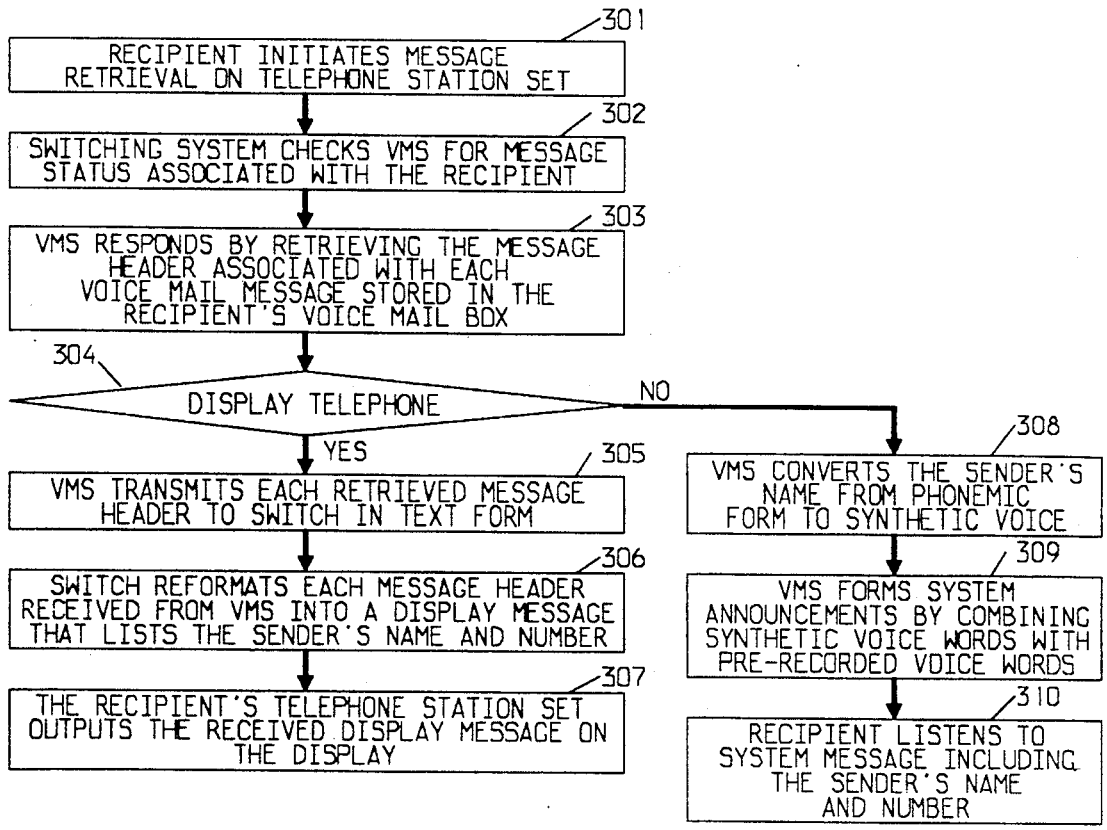

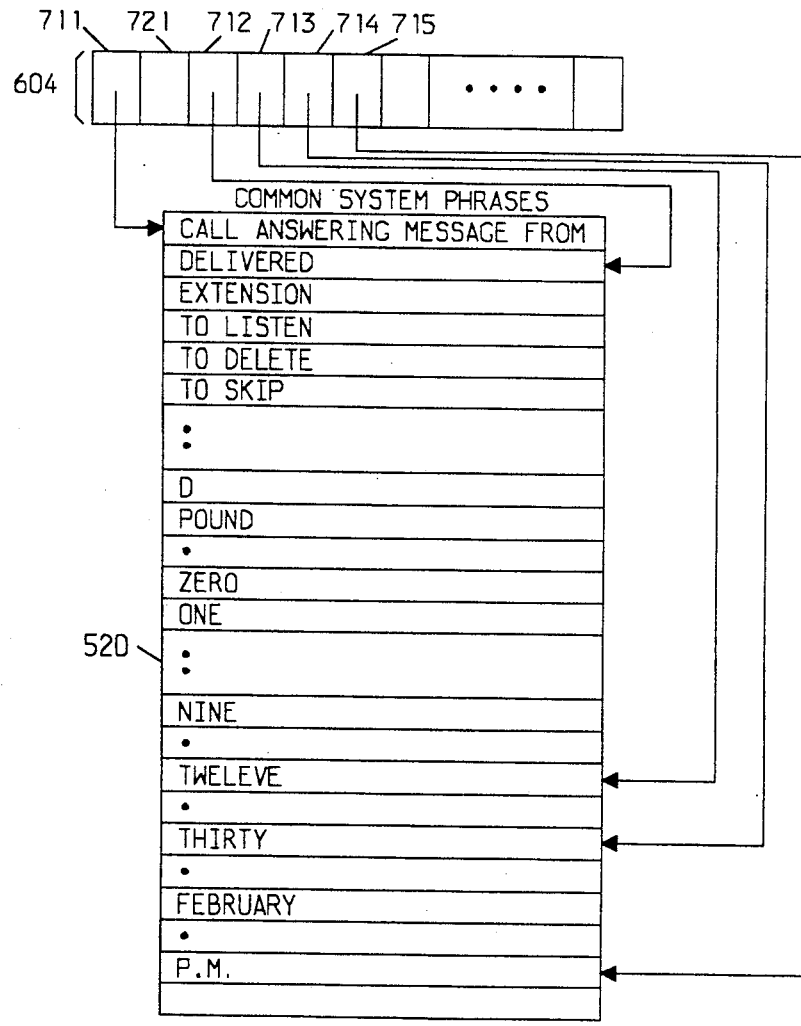

VOICE MESSAGE SYSTEM USING SYNTHETIC SPEECH

TECHNICAL FIELD

This invention relates to message service systems generally and, more specifically, to a voice message system using synthetic speech.

BACKGROUND OF THE INVENTION

Present voice message systems use encoded voice samples to store both the system-generated announcement messages and the subscriber-recorded messages. Since about 2,000 bytes of memory are required to store each second of speech, the size of the system memory required to store the system announcements and the subscriber-recorded messages increases quickly with system size.

When two or more voice message systems are interconnected or networked together, communications typically take the form of a header and a voice message. The header typically includes subscriber identification (e.g., calling party's or message sender's name), message delivery time, and message status. Because of the large amount of data required to store a message sender's name as encoded voice samples, sender identification has only been available in text form or as a telephone number in the header. Consequently, display telephones have been required to provide a message recipient with the sender's identification in the form of text or a telephone number. Even if the header size could be increased, the transmission of the sender's name in encoded voice form would take about two to four seconds per name and add significantly to the overall telephone calling cost, and would have a substantial effect on the throughput of the message service system.

While the use of speech coding techniques has been applied to the encoded voice samples to reduce the size of memory needed by a voice message system, speech coding has not solved the above-identified problems.

SUMMARY OF THE INVENTION

While one technique of using phonemes is known to significantly reduce the amount of memory required to store voice sounds, the use of phonemes has not been utilized in voice message systems because the resulting voice quality is not very good. Thus, one choice is between using prior art encoded voice sampling techniques (which offer good voice quality, but inefficient memory utilization) or using phonemes (which offer poorer voice quality, but efficient memory utilization) for storing voice messages.

We have solved the above problems by discovering how to use phonemes to drastically reduce the size of memory required for a voice message system (VMS) without significantly affecting the overall quality of the system voice announcements. According to one aspect of the present invention, a VMS forms system announcements using synthetic voice words, generated from phonemes, which are combined with pre-recorded voice words. Typically, system voice announcements include a common phrase (e.g., "you have a call from") and a subscriber-specific phrase (e.g., subscriber names "John Doe"). The common phrases do not generally increase in number with an increase in VMS size (i.e., increase in the number of subscribers served by the VMS) as do subscriber-specific phrases which increase directly with an increase in VMS size. Thus, for a VMS system with many subscribers, the subscriber-specific phrases would occupy a much greater portion of memory than would the common phrases. According to the present invention, the common phrases are produced using pre-recorded voice words (i.e., using encoded samples of actual speech) while subscriber-specific phrases (e.g., subscriber-names) are produced using synthetic voice words (generated using digitally encoded phonemes). By using digitally encoded phonemes for subscriber-specific phrases, the size of memory can be drastically reduced.

Moreover, because the length of a subscriber-specific phrase is short compared to the length of the common phrase portion of the system announcement, the overall message quality remains surprisingly good. According to another aspect of the present invention, the quality of the synthesized voice for subscriber-specific phrases is enhanced using an administration terminal which enables a system administrator to edit the phonemic representation to obtain the closest match to the pronunciation of the subscriber-specific phrase prior to that subscriber-specific phrase being stored in memory.

In accordance with yet another aspect of the present invention, when two or more message service systems are interconnected in a network arrangement, sender identification messages (e.g., address headers) sent between the message systems include a phonemic representation of the message sender's name. The use of phonemes in the address header enables the receiving message system to convert the sender's name in phoneme form to a synthetic voice for output to a telephone set.

BRIEF DESCRIPTION OF THE DRAWING

In the drawing,

FIG. 2 shows a flowchart illustrating the message origination operation;

FIG. 3 shows a flowchart illustrating the message retrieval operation;

FIG. 6 illustrates the voice mail box format;

FIG. 7 shows an illustrative organization of a system announcement message; and

DETAILED DESCRIPTION

Before proceeding with the operating description of the present invention, it should be noted that the present invention may be utilized in a variety of voice message systems. Since such message systems utilize a variety of hardware and programming techniques, no attempt is made to describe the existing programs used to control these message systems. However, the present invention is to be integrated into the overall structure of the message system in which it is used and is to be conformed to other features and operations of the system. Thus, in order to avoid confusion and enable those skilled in the art to practice the claimed invention, this specification will describe the operation of the present invention using the block diagram of FIG. 1, the flowcharts of FIGS. 2, 3 and 8, and the various message and memory formats shown in FIGS. 4 through 7 which, together, are used to describe the operating steps to implement the present invention. In the following description, the first digit of an element's reference number designates the figure where the element is located (e.g., 102 is located in FIG. 1).

Figure 1:
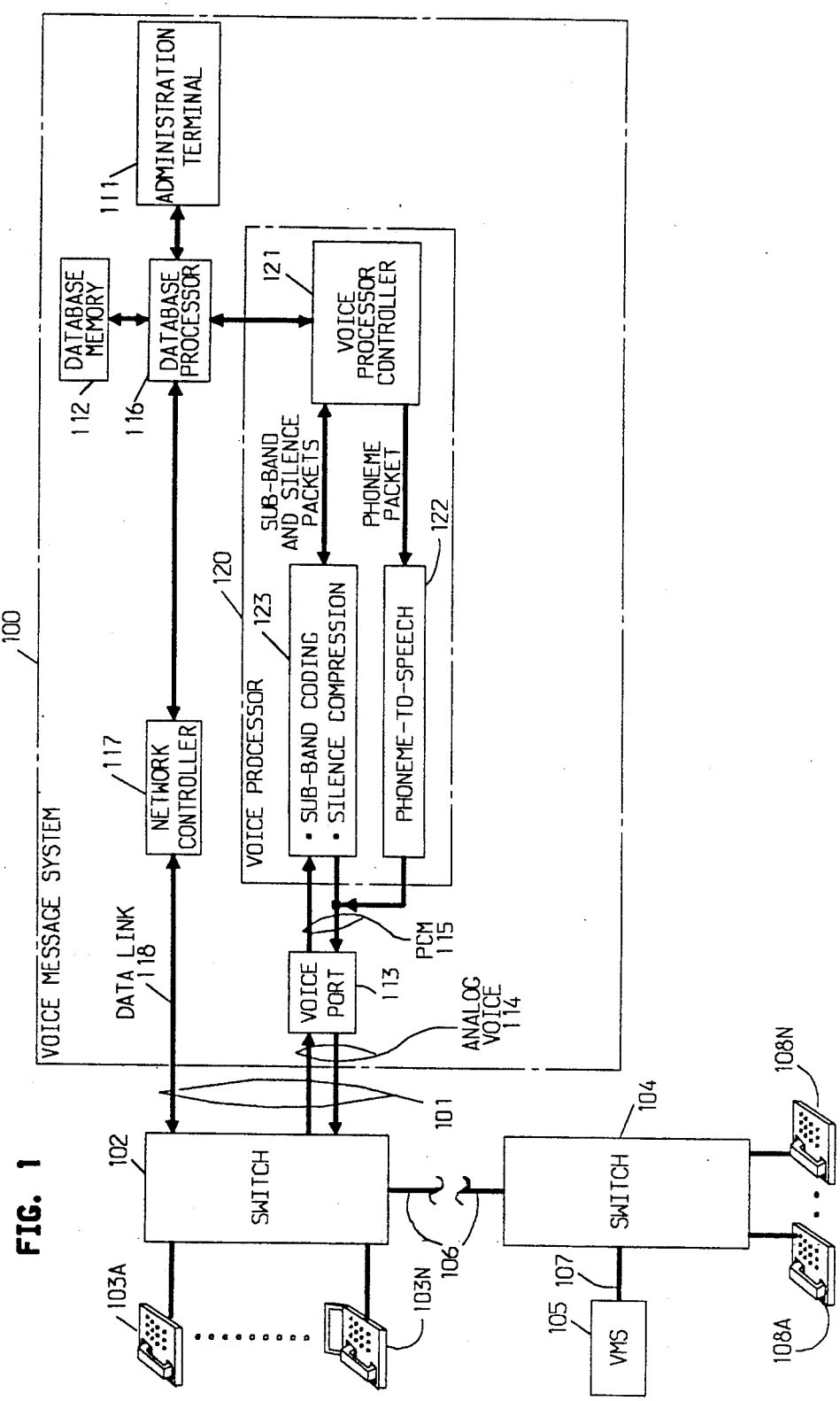
FIG. 1 shows a block diagram of a voice message network including a voice message system useful in describing the present invention.
Figure 4:
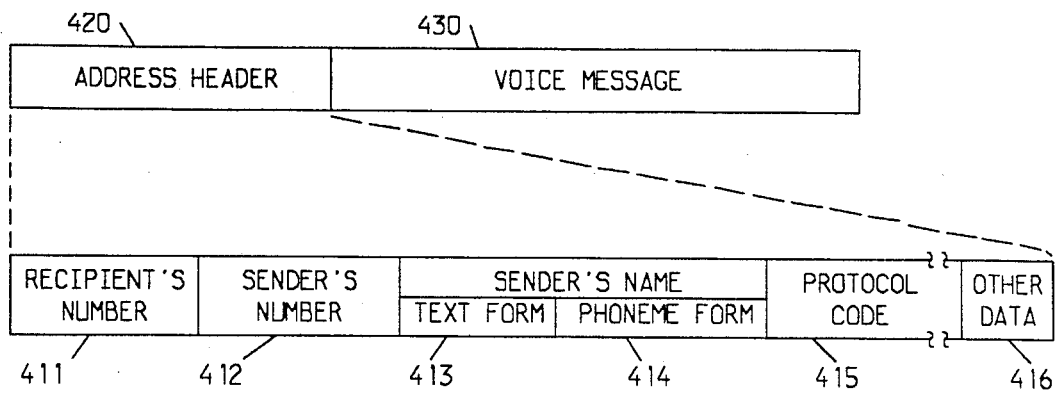
FIG. 4 illustrates the network voice mail message format.

Shown in FIG. 1 is a block diagram of an illustrative Voice Message System (VMS) 100 useful in describing the present invention. In FIG. 1, the VMS 100 is shown connected as part of a voice message network including communication switching systems, or switches, 102 and 104 and VMS 105. VMS 100 connects via a communication facility 101 to communication switching system 102. One well-known VMS which, illustratively, may be modified to perform the operations of the present invention is an audio exchange system (AUDIX) manufactured by AT&T. Such a VMS arrangement is described in U.S. Pat. No. 4,790,003, issued to G. D. Kepley, et al, on Dec. 6, 1988, whose description is incorporated herein by reference.

The switching system 102 may be a key telephone system, private branch exchange (PBX), or Centrex, etc., which controls access to VMS 100 by a plurality of stations sets 103A-103N. Similarly, switching system 104 controls the access to VMS 105 by a plurality of station sets 108A-108N. Illustratively, the switching systems 102 and 104 may each be an AT&T System 75 Digital Communications System as described in the article entitled "System 75: Communications and Control Architecture" by L. A. Baxter, et al, published in the *AT&T Technical Journal, Jan.*, 1985, page 153, et seq. The station sets used with the switching systems 102 and 104 may be well-known non-display stations sets (e.g., 103A) or display station sets (e.g., 103N). Alternatively, any type of terminal having audio communication capability can be utilized as a station set in the present arrangement.

VMS 100 includes voice port 113 for interfacing the switching system 102 to voice processor 120. Voice port 113 provides loop start signaling for analog connections to the line circuits (not shown) in switching system 102. Voice port 113 also performs analog-to-digital (A/D) and digital-to-analog (D/A) voice signals on facility 114 and the digital 64 kilobits per second (kbps) Pulse Code Modulation (PCM) voice signals on leads 115.

Voice processor 120 connects to database processor (DBP) 116 which connects to database memory 112 and adminstration terminal or workstation 111. The DBP 116 also connects to a network controller (NC) 117 which enables a computer-to-computer data file transfer between VMS 100 and VMS 105. Datalink 118 provides a connection between NC 117 and switching system 102.

Database memory 112 (further illustrated in FIG. 5) includes the operating programs, including those flowcharted in FIGS. 2 and 3, needed to control VMS 105 to provide the features of the present invention. Database memory 112, hereinafter memory 112, also includes system subscriber information and voice files utilized by VMS 100.

The administration terminal 111 (further illustrated in FIG. 8), in accordance with one aspect of the present invention, generates and edits the phonemes used to generate the synthetic voice words or messages used in VMS 100. Phonemes are text symbols and associated stress, duration and pitch parameters used to represent speech sounds.

Voice processor 120 also performs touch-tone detection and message queuing as described in the previously referenced Kepley patent. Voice processor 120 includes voice processor controller (VPC 121) which, among other functions, controls the operation of phoneme-to-speech circuit (PSC) 122 and coding and compression circuit (CCC) 123. The PSC 122 generates synthetic voice words from phonemes. The CCC 123 receives from and outputs to voice port 113 the 64 kbps PCM signals representing the pre-recorded voice words. VPC 121 sequences the operation of PSC 122 and CCC 123 to form system announcements by combining the synthetic voice words and pre-recorded vocie words. VPC 121 also controls CCC 123 to permit the output of voice messages previously recorded by the message sender. Voice port 113 converts these system announcements and sender messages from PCM encoded digital form to an analog voice for output to switching system 102.

The CCC 123 includes a speech coding circuit to compress the bandwidth of the received 64 kbps PCM signal to a 16 kbps coded (sub-band coded) voice signal. The sub-band speech coding reduces the amount of memory 112 required to store the recorded system announcements and sender voice messages. During playback CCC 123 receives the 16 kbps sub-band coded voice signal from memory 112 via DBP 116 and expands it into a 64 kbps PCM signal for output via voice port 113 to the appropriate party.

The CCC 123 also includes circuitry to compress the silence interval between speech utterances. The silence interval is compressed differently than the voice signals. During the recording process, voice processor 120 determines whether a PCM encoded voice signal is present on the output of voice port 113 by examining the short-term energy of the input signal received from voice port 113. When the energy of the input signal falls below a predetermined threshold, it is considered to be silence by CCC 123. Then CCC 123 sends a compressed digitally encoded silence packet, which includes the duration of the silence interval, which is stored along with the coded voice signals in database 112 by DBP 116. For playback, CCC 123 expands the compressed digitally encoded silence packet into a PCM encoded silence duration.

The PSC 122 retrieves the previously stored digitally encoded phonemes in packet form from memory 112 via DBP 116. The phonemes (including the stress, duration and pitch parameters see Table 1) are stored as ASCII characters in memory 112. The PSC 122 converts the phonemes using a predetermined algorithm to PCM encoded synthetic speech. This PCM encoded synthetic speech also uses the 64 kbps PCM format. Illustratively, PSC 122 may be implemented using an AT&T Voice Power Board. As previously noted, this PCM encoded synthetic speech is converted to a synthetic analog voice signal by voice port 113.

VMS 100, facility 101, switching system 102, facility 106, switching system 104, facility 107, and VMS 105 together form a VMS network. This VMS network provides telephone and voice message communication services to the plurality of station sets (e.g., 103A-103N, 108A-108N). The operation of switching systems 102 and 104 in establishing telephone calls between any of the stations sets 103A-103N, 108A-108N proceeds in a well-known manner. Obviously, the illustrative facility 106 which interconnects switching systems 102 and 104 could include one or more central offices, common carrier switching offices and associated facilities to provide communication services between the VMS network station sets of FIG. 1.

The operation of the present invention will be described for both an inter-VMS message transfer and an intra-VMS message transfer. An inter-VMS message transfer or call is made between two parties located on two different VMS units (i.e., VMS 100 and VMS 105). An intra-VMS message transfer or call occurs when both parties are connected to the same VMS, e.g., VMS 100.

Prior to a VMS being placed in service, the prerecorded common phrases (i.e., common voice words or messages which are pre-recorded and stored in the VMS 100 and which are played back to a recipient by VMS 100) must first be encoded and stored in memory 112. In accordance with the present invention, administration terminal 111 (hereinafter terminal 111) is used to generate the subscriber-specific phrases in phonemic form. While these subscriber-specific phrases may be subscriber names or other words to identify the subscriber, they are, hereinafter, referred to as subscriber names. These phonemes (including the associated stress, pitch and duration parameters) phonetically define the proper pronunciation of subscriber names. Optionally, other common phrases could also be stored in phonemic form. These phonemes are stored in digitally encoded form (as ASCII characters) in memory 112.

A separate terminal 111 may be provided for VMS 105. Alternatively, terminal 111 can be shared between VMS 100 and VMS 105. In a shared application, terminal 111 may connect to VMS 105 via a modem link (not shown). In this way, terminal 111 may also be used to create the names and system messages for subscribers served by VMS 105. Such "remote administration" is desirable when VMS 105 is a small location which does not warrant its own terminal 111. The detailed operation of terminal 111 is described in a subsequent part of the specification. In the following description of the Voice Message Network shown in FIG. 1, it is assumed that each message system (i.e., VMS 100 and VMS 105) maintains its own subscriber information file.

Figure 5:
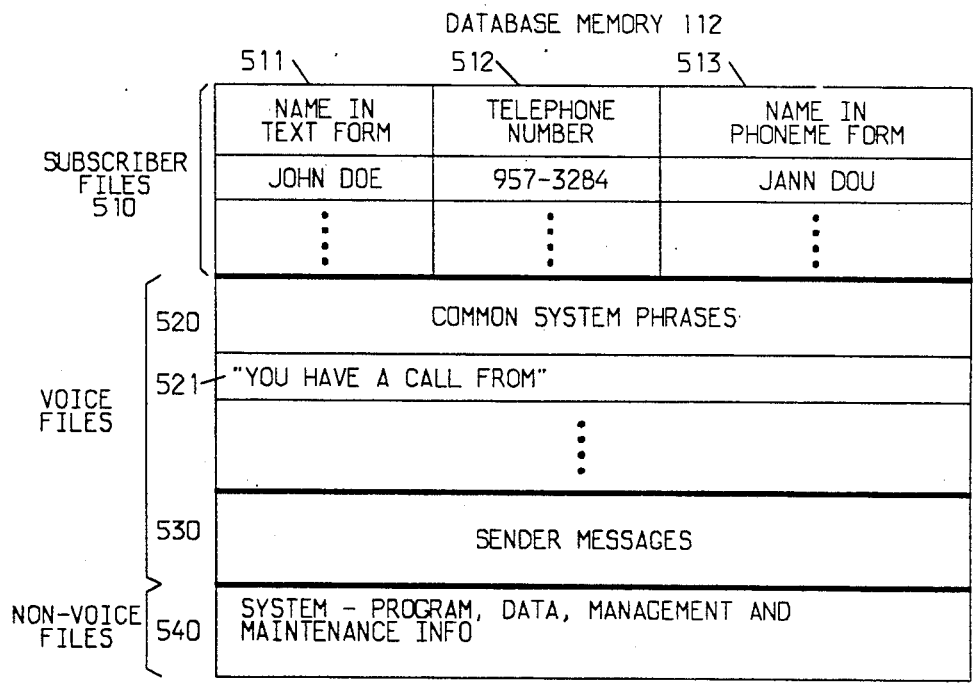
FIG. 5 illustrates the organization of the database memory.

After generating a subscriber name in phonemic form using terminal 111, the phonemes are stored in digitally encoded form (as ASCII characters) in memory 112 of DBP 116. With reference to FIG. 5, database memory 112 includes subscriber information files 510, voice files 520 and 530, and non-voice files 540. The subscriber information file 510 stores the subscriber's name in text form 511, the subscriber's telephone number 512, and the subscriber's name in phoneme form 513. Because phonemes significantly reduce the amount of storage needed for a typical subscriber's name from about 4,000 bytes (digitally encoded voice) to about 40 bytes, (ASCII characters see Table 1), the amount of the subscriber information file 510 is significantly smaller. When multiplied by the number of subscribers (maybe hundreds or thousands) served by a VMS system, the savings in the amount of memory required for the subscriber information file 510 is enormous.

As previously noted, another feature of the present invention is that a number of different types of prerecorded common phrases (e.g., 521), can also be generated in phonemic form and the phonemes stored in voice file 520 of memory 112. Thus, voice file 520 may include system announcements that are stored as phonemes or as digitally encoded voice. Additionally, telephone numbers can be stored in phoneme form, thereby enabling the audio output of the telephone number to non-display terminals.

It should be noted that each one of the several types of common system phrases in voice file 520 can be combined with any of the subscriber names in subscriber file 510 to form a system voice announcement.

Voice file 530 is used to store digital encoding of voice mail messages from a message sender for delivery at a later time to a message recipient. The non-voice file 540 may, illustratively, be used to store the VMS operating programs (including the programs for implementing FIGS. 2 and 3) and data as well as VMS management and maintenance information.

Assuming that the subscriber information file 510 and the common system phrases in voice file 520 have been completed for VMS 100 and 105 the continued operation of the present invention is described. The following description references FIGS. 1, 2 and 4-6.

There are two distinct communication features available with VMS 100 and VMS 105: Voice Mailbox (VM) and Call Answering (CA). These are described in the previously cited Kepley patent at column 1, lines 16-49. A voice mail message is created, illustratively, as follows:

Voice Mailbox Feature: A network voice mail message 400 is first created for the sender at VMS 100 by DBP 116. An address header 420 including the sender's identity is formed and sent together with the voice message 430 through the VMS network to VMS 105. When the network voice mail message 400 is received, the DBP (not shown) in VMS 105 strips the header information and stores it in the recipient's voice mail box 600. The recipient receives a message waiting indication and retrieves the voice mail message.

Call Answering Feature: The calling party (hereinafter sender) at switching system 102 calls a called party (hereinafter recipient) at switch 102 or switching system 104 and leaves a voice message if the recipient is not available. The voice message and sender's identity are stored in the recipient's mail box (e.g., 600).

1. Case I: (The recipient is a subscriber of VMS 100)— The sender's identity will be formed by the DBP 112 and saved in the recipient's voice mail box.

2. Case II: (The recipient is a subscriber of VMS 105)— This call is treated as an outside call. The sender's identity is not known to VMS 105. This sender's identity, however, may be provided in the future as part of a header of an Integrated Services Digital Network (ISDN) or similar network.

Thus, while the invention presently applies to the Voice Mailbox feature or to Case I of the Call Answering feature, it is contemplated that it can also be applied to Case II. A more detailed operation of the present invention which is applicable to both the voice mailbox and call answering features is described in the following paragraphs.

In step 201 of FIG. 2, assume a message sender at station set 108A of switching system 104 generates a voice mail message, in a well-known fashion, at originating VMS 105 and designates a message recipient (e.g., station set 103A) who is served by VMS 100.

The originating VMS 105, in step 202, first determines if the message recipient is a subscriber of VMS 105. This is done by comparing the recipient's telephone number against the list of telephone numbers serviced by VMS 105. If the recipient is not located at VMS 105, as is the case in our example, then VMS 105 responds by transmitting, in step 203, the network voice mail message 400 to the destination VMS 100 system.

The transmission of digital network voice mail message 400 may be efficiently accomplished in a known manner, e.g., by performing a computer-to-computer data file transfer between the originating VMS 105 and destination VMS 100. As previously noted, the network controller (e.g., NC 117) at each VMS performs this function. In the previously referenced Kepley patent, the computer data file transfer operation was described using well-known data integrity and data correction arrangements to preserve the quality of the transmitted voice message 430.

The network voice mail message 400 consists of address header 420 and the sender's digitally encoded and compressed voice message 430. The VMS 105 assembles header 420 by obtaining from the subscriber file 510 the sender's name in phonemic form 414 and, optionally, in text form 413, as well as the telephone number 412 of the message sender. The VMS 105 also includes in the header 420 the telephone number 411 of the message recipient, and a protocol code 415 required for a data file transfer as described in the previously cited Kepley patent.

The originating VMS 105 generates header 420 by using the message sender's telephone number that it receives from switching system 104. VMS 105 uses the sender's telephone number to access the subscriber information file 510. Using the sender's telephone number 512, VMS 105 obtains the sender's name in text form 511 and in phoneme form 513 which together with the sender's number 512 are inserted in header 420. The network voice mail message 400 is formatted by VMS 105 by combining the header 420 with the sender's voice message 430. Network voice mail message 400 is then transmitted to the destination VMS 100 in step 203. In step 204, the destination VMS 100 stores data from the header 420 of the message in the recipient's voice mail box 600 and the sender's voice message 430 is stored in the voice file 530 of memory 112.

The recipient's mail box 600 stores the sender's name in text and phoneme form 601; the time-of-day (TOD) of the received message 602; a message status 603; a common phrase ID 604; and a voice file address 605. The common phrase ID 604 may point to a memory address (as shown in FIG. 7) which includes a numerical code to identify one of a plurality of common phrases to be played to the recipient. Alternatively, common phrase ID 604 may include the numerical code itself. As previously noted, location 604 may include a plurality of codes which identify a plurality of common words or phrases in voice file 520. The voice file address 605 identifies the location in voice file 530 where the sender's message is stored.

The recipient then receives, in step 205, a message-waiting indication on telephone station set 103A to indicate the presence of one or more voice mail messages.

In step 202, when the sender and recipient are served by the same VMS (e.g., sender at station 103N and recipient at 103A), an intra-VMS voice mail message is stored in the recipient's mail box (step 206) at VMS 100 and a message-waiting indication is given to the recipient (step 207).

The following description references FIGS. 1, 3, 4 and 6 and describes how a recipient reviews and/or retrieves his or her messages.

To review the list of messages, the recipient initiates step 301, the message retrieval function at telephone station set 103A in a well-known manner. For message retrieval, the recipient may have to dial a special number, receive prompts, and enter additional identification codes and passwords before obtaining messages.

In step 302, switching system 102 checks VMS 100 for the message status 603 of mail box 600 for station set 103A. Note, the messages can also be stored and retrieved by using the recipient's name or code rather than by recipient's station number. In such a case, the VMS subscriber can enter his or her personal code and the system will retrieve all messages stored in the mail box (e.g., 600) associated with that personal code.

In step 303, VMS 100 responds by obtaining the header associated with the oldest unretrieved voice mail message from that recipient's mail box 600. This is done by checking the TOD entry 601 for each voice mail message in mail box 600. In step 304, in accordance with the present invention, the voice processor 120 obtains from switching system 102 data which identifies whether or not the station set 103A is a display telephone. Assume for the moment that the station set 103A is a display telephone, then VMS 100 handles the call in the manner described in the previously referenced Kepley patent. That is, VMS 100 transmits in chronological order, in step 305, each message header 400 to switching system 102. In step 306, switching system 102 receives each message and the sender's number 412 or name in text form 413 is reformatted into a display message. At station set 103A, in step 307, the sender's number (or sender's name in text form) is then displayed. The recipient may then appropriately sequence through an index of voice mail message senders before selecting to listen to a particular sender's voice mail message.

In our example however, station set 103A is not a display station set and, consequently, cannot receive text information identifying the senders of the voice mail messages. In the prior art arrangements, a recipient at a non-display station set was simply advised "you have voice mail." The recipient would not then know the identity of the sender and hence could not selectively access the voice mail messages but could only sequentially access the messages in the chronological order that the messages were received.

In accordance with the present invention, when the recipient uses a non-display station set 103A to retrieve his or her messages, VMS 100 generates, in step 308, the sender's name in synthetic voice. (As previously noted, the sender's telephone number could also be outputted as synthetic voice.) Controller VPC 121 of voice processor 120, in step 308, retrieves the sender's name in phoneme form 601 from the recipient's mail box 600.

The following table 1 shows, illustratively, the information required for storing the name "John Doe" as two synthetic voice words (Jann Dou) using the phonemic representation for each synthetic word. Each synthetic word is comprised of a series of phonemes. As noted above, phonemes are text symbols and associated stress, duration and pitch parameters used to represent speech sounds. These phonemes and the various parameters are generated by administration terminal 111 as will be described in a later paragraph.

TABLE 1

| Phonemes | Stress | Duration | Pitch |
|---|---|---|---|
| j | 0 | 709 | 95 |
| a | 1 | 12 | 96 |

TABLE 1-continued

| Phonemes | Stress | Duration | Pitch |
|---|---|---|---|
| nn | 0 | 7 | 99 |
| d | 0 | 4 | 110 |
| o | 0 | 7 | 71 |
| u | 1 | 25 | 75 |

Note that the stress, duration and pitch for each phoneme are also stored in the subscriber database. The memory space required to store the name "John Doe" in phoneme form is about 40 bytes (1 byte per alphanumeric character). Each character is stored in ASCII format. Compared with 4K bytes, which is required for an illustrative voice encoding scheme, the savings is approximately two orders of magnitude.

Controller VPC 121 obtains the subband encoded common phrase from voice file 520 using the common phrase code 604 obtained from the recipient's mail box 600. Controller VPC 121 in step 309 forms a system announcement in PCM encoded form for output via voice port 113 and switching system 102 to station set 103A. This PCM encoded system announcement is formed, in step 309, by combining the common phrase (e.g., 521-"you have a call from") with the sender's name in PCM encoded phonemic form. The sender's name in PCM encoded voice form is generated by the PSC 122 from the calling party's name in digitally encoded phoneme form 513 (e.g., "Jann Dou").

Voice port 113 converts the PCM encoded voice system message to an analog voice message for output to switching system 102 over analog facility 114. The switching system 102 receives the analog voice message, converts it to a digital signal, and switches the digital signal to the proper station port (not shown) for conversion to an analog signal for output to the listener at analog station set 103A (e.g., a standard station set).

In step 310 the recipient listens to the system announcement which includes pre-recorded voice words (common phrases) and synthetic voice words including the sender's name and, optionally, the sender's number. In this manner, the listener at non-display station set 103A may audibly sequence through the list of waiting voice mail messages to determine who sent each message before selecting to listen to any particular sender's voice mail message. It should be noted that steps 308-310 can also be utilized with a display telephone.

Shown in FIG. 7 is an alternative embodiment where the desired common phrase is constructed from several common phrases system words or phrases which are stored in voice file 520 and which are combined or pieced together with the sender's name to form the overall announcement. Controller VPC 121 accesses the common phrase ID 604 in the recipient's mail box 600 to obtain the codes to enable it to generate the system announcement which is to be outputted to the recipient. As noted earlier, the system announcement location 604 may be a code which identifies the address of the particular common phrase to be used in the system announcement. Alternatively, as previously noted and as illustrated by FIG. 7, the location 604 may store a plurality of codes which specify the order and identify the addresses of common words or phrases (711-715) which are combined or pieced together with the sender's name to form the system announcement. More generally, it is contemplated that the system announcement may include several common words or phrases intermixed or combined with several subscriber-specific words.

As shown in FIG. 7, the system phrase ID 604 identifies a system announcement for a recipient using parameters 711, 712, 713, 714, 715, etc., which identify various common phrases to be used in the system announcement. Location 721 indicates where the sender's name (obtained from location 601) is to be placed in the system announcement relative to the common phrases 711-715.

Controller VPC 121 sequences the outputting of the PCM encoded common phrases 711-715 via the CCC 123 to voice port 113 and sequences the phonemes 601 via PSC 122 to voice port 113 to form the overall system announcement. As previously noted, circuit PSC 122 converts the digitally encoded phonemes to PCM encoded synthetic voice signals using a commercially available AT&T Voice Power Board.

These PCM encoded common phrases and the PCM encoded synthetic voice signals are converted to the analog system announcement by voice port 113. The resulting system announcement output to the recipient at station set 103A is "call answering message from John Doe, delivered twelve-thirty P.M. . . ."

The use of synthetic speech in the form of phonemes provides several advantages for a group of VMS's arranged in a network such as is shown in FIG. 1. When networking two or more VMS's together, each VMS may (1) store and maintain its own subscriber's name database or (2) store and maintain the name of all subscribers connected to the VMS network. In the prior art, the disadvantage of using the first approach is that the sender's name was not made available to the recipient in audible form but only in text form, consequently requiring a display terminal at the recipient's location to identify the sender. As previously described, the present invention has solved this problem by using the subscriber's name in phoneme form, which reduces by a factor of about 100 the amount of memory needed to store subscribers' names. The use of phonemes enables the sender's name to be sent as part of the voice mail header to the destination VMS where the phonemes are converted to synthetic voice for output over a non-display station set.

In the prior art, the advantage of using the second approach (i.e., all subscribers' names at all VMS locations) was a saving in transmission cost and time, since the sender's name was already available at each VMS location and it did not have to be transmitted between VMS locations. Undesirably, however, each subscriber's name required a minimum of 4K bytes of memory per name. In these applications where all the subscribers' names at each of the VMS locations have to be stored at each of the VMS locations, the memory requirements for each VMS location becomes inordinately large. According to the present invention, the subscriber-name memory requirements are typically reduced by a factor of 100 and, consequently, this second approach is again a viable option for networked VMS's. It should be noted, however, that the advantage of the second approach, i.e., of reduced transmission cost and time, has disappeared since the phonemes are made part of the header which accompanies the sender's voice mail message.

PHONEME GENERATION AND ADMINISTRATION

The use of phonemes for subscriber-specific phrases (e.g., subscriber names) also makes the administration more efficient. In the prior art, the administrator speaks a subscriber's name into the VMS where it is sampled, digitized and stored in memory 112. Subsequently, if a subscriber doesn't like the way his or her name is pronounced, he or she can call the administrator to change the pronunciation. Since a typical system has many subscribers, the administration of subscriber names is very time-consuming.

In accordance with another feature of the present invention, the administration of the subscriber names becomes much easier. Instead of recording the subscriber names into memory 112, an administrator having entered the subscriber names in text form, uses a phonemic editor to edit them. By combining a proper name dictionary with name-to-sound rules, the accuracy rate of pronouncing proper names has been found to be approximately 95 per cent. An administrator only needs to edit subscriber names approximately 5 per cent of the time. When the proper name dictionary is increased to include many more proper names, the need for an administrator to edit the subscriber database will be even less.

The present invention also makes the administration of a remote VMS easier. Thus, terminal 111 can be located at VMS 100 and can administer a remote subscriber database at VMS 105.

Figure 8:
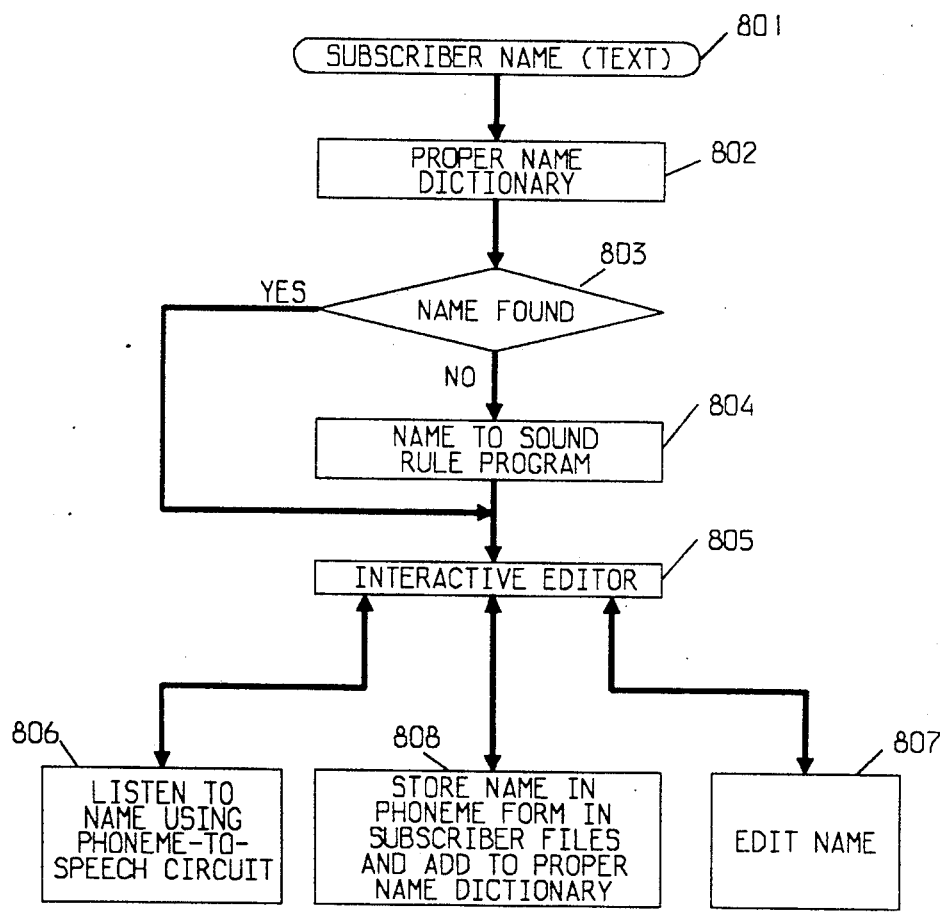
FIG. 8 shows a flowchart of an administration terminal used to generate the phonemes.

FIG. 8 shows the block diagram of terminal 111 of FIG. 1. The terminal 111 shown in FIG. 1 may be incorporated into VMS 100 or may be a separate terminal which connects to VMS 100. The terminal 111 converts the subscriber's name in ordinary English text to phoneme form. In the present application, the terminal 111 accepts subscriber names as input strings of ASCII text, step 801, which is checked, in step 802, against proper names in text form located in a proper name dictionary or file. The proper name dictionary (or file) stores both the text spelling and the phonemic transcription of a plurality of proper names. As previously noted, the phonemic transcription includes the phonemes as well as stress, duration and pitch parameters. Table 1, previously described, illustrates the phonemes and various parameters which represent the name "John Doe".

In step 803, if a match is found in the proper name dictionary, the phonemic transcription of the name is sent, in step 805, to an interact editor. If no match is found, a name-to-sound rule program is enabled, in step 804, which utilizes rules from several different languages to generate the phonemic representation for the correct pronunciation of a subscriber's name. The name-to-sound program can be, by way of example, the Namsa ("name-say") program developed by AT&T. Such a program is described in the article entitled "Stress Assignment in Letter-to-Sound Rules for Speech Synthesis" by K. W. Church, published in the *Proceedings of the 1986 IEEE International Conference of Acoustics, Speech and Processing*, Vol. 4, 2423-2426, April, 1986.

Namsa is a system for pronouncing proper names in multiple languages. The program accepts a name, determines its etymology by analyzing multi-letter sequences and calculating probabilities of such occurrences associated with each nationality, and applies the appropriate language machine to the names to generate a phonemic transcription that describes the pronunciation.

The subscriber name in phoneme form obtained from either the proper name dictionary or from the name-to-sound program is received by interactive editor in step 805. An administrator using an interactive editor, in step 805, may then listen to the pronunciation of the proper name constructed by a phoneme-to-speech circuit in step 806, edit it in step 807, and then save the correct phonemic transcription in the proper names dictionary and subscriber file 510 in memory 112.

By combining a special-purpose proper names dictionary and name-to-sound rules, a reasonably high pronunciation accuracy rate is achieved for proper names. Thus, the administrator need only edit names that are mispronounced by the administration terminal. This is accomplished by changing the stress, duration or pitch characteristics of the phonemes.

While the present invention has described a voice message system which uses subscriber names in phonemic form, it should be understood that the common phrases used by the voice message system could also be generated and stored as phonemes. Also, while PCM digital coding and sub-based coded compression were described herein, other types of digital coding and compression can be utilized with the invention. Additionally, while the present invention has described that subscriber names or other subscriber-specific words or phrases can be included as phonemes in an address header of a network voice mail message, it should be recognized that these phonemes could also be included in other protocols, such as X.25 and ISDN, without departing from the teachings of the present invention.

Thus, what has been described is merely illustrative of an application of the principles of the present invention. Other methods, sequences or circuits can be used to implement the present invention by those skilled in the art without departing from the spirit and scope of the present invention.

We claim:

1. A voice message system for communicating system voice announcements to system subscribers, said system comprising
   first means for storing a plurality of pre-recorded voice words;
   second means for storing a plurality of synthetic voice words using a phonemic representation for each synthetic voice word; and
   means for forming, in response to a subscriber request, a system voice announcement for said subscriber including at least one of a plurality of stored pre-recorded voice words, stored in said first storing means, which is combined with at least one of said plurality of synthetic voice words generated from its phonemic representation.

2. The system of claim 1 wherein
   said plurality of pre-recorded voice words are words which are common to system voice announcements of a given type, and
   said plurality of synthetic voice words are words which are not common to system voice announcements of said given type.

3. The system of claim 1 wherein
   said plurality of synthetic voice words includes the names of system subscribers.

4. The system of claim 3 further comprising means for receiving a voice mail message from a system subscriber message sender directed to a recipient subscriber;

means responsive to a received voice mail message for creating a message header for said recipient subscriber identifying the message sender's name using a phonemic representation obtained from said second storing means and identifying a group of said plurality of pre-recorded voice words; and wherein said forming means uses said message header to form a system voice announcement for said recipient subscriber in response to a request for said recipient subscriber.

5. The system of claim 3 including means for receiving the name of a first system subscriber in text form, and means for generating and storing in said second storing means at least one or more synthetic voice words in phoneme form representing the first subscriber's name.

6. The system of claim 5 further including means for reconstructing, using a phoneme-to-speech circuit, said at least one or more synthetic voice words representing the first subscriber's name for output to a system administrator; and means for editing, in response to said system administrator's input, at least one parameter of a phoneme of one of said at least one or more synthetic words representing the first subscriber's name.

7. The system of claim 3 including a proper name file including proper names in text form and said proper names in phoneme form, and means for comparing a received first subscriber name, in text form, against said proper names in said proper name file and when a match is found in said proper name file storing the phoneme form of the matched proper name as the phonemic representation of the first subscriber's name in said second storing means.

8. A voice message system for communicating digital voice mail messages over a communication facility, said system comprising means for storing a plurality of synthetic voice words as digitally encoded phonemes, said words identifying potential system message senders; and means responsive to a message call received from a system message sender to a non-system message recipient for obtaining digitally encoded phonemes from said storing means to identify the system message sender and transmitting a digital voice mail message, including said phonemes, over said communication facility to said non-system recipient.

9. The voice message system of claim 8 wherein the digital voice mail message also includes the system message sender's name in text form.

10. The voice message system of claim 8 wherein the digital voice mail message further includes a digitally encoded voice message received from said system message sender.

11. A voice message system comprising means for receiving, over a communication facility, a digital voice mail message directed to a system message recipient, said message including the identity of a non-system message sender represented as digitally encoded phonemes; and means for forming a system voice announcement for said recipient including at least one synthetic voice word identifying the non-system message sender, said at least one synthetic voice word being generated using said digitally encoded phonemes.

12. The voice message system of claim 11 wherein said digital voice mail message includes the non-system sender's name in digitally encoded text form, and wherein said voice message system includes means for decoding the digitally encoded text into the non-system sender's name in text form suitable for output to a system display station set.

13. In a voice message system, a method of communicating system voice announcements to system subscribers comprising the steps of:

storing a plurality of system subscribers's names in a system memory in digitally encoded phonemes;

storing in digital form a plurality of pre-recorded voice words in said system memory;

receiving a voice mail message from a system subscriber sender directed to a system subscriber recipient, said voice mail message identifying the sender;

in response to said received voice mail message creating a message header for said recipient including the sender's name in digitally encoded phonemes obtained from said system memory using said sender's identity and identifying a group of said plurality of pre-recorded voice words; and forming in response to a request from said recipient, a system voice announcement from said message header, said system voice announcement including a synthetic voice message generated from the sender's name in digitally encoded phonemes combined with said identified group of said plurality of pre-recorded voice words.

14. The method of claim 13 wherein the identified group of said plurality of pre-recorded voice words includes the sender's telephone number.

15. The method of claim 13 further including the steps of:

receiving the name of a system subscriber in text form, and generating and storing in said system memory the received subscriber's name in digitally encoded phoneme form from the received subscriber's name in text form.

16. The method of claim 15 further including the steps of:

constructing, using a phoneme-to-speech converter, from the subscriber's name in digitally encoded phoneme form a synthetic voice message representing the received subscriber's name for output to a system administrator; and editing, in response to said system administrator's input, at least one parameter of a phoneme of the received subscriber's name prior to storing the received subscriber's name in phoneme form.

17. The method of claim 15 further including the steps of:

comparing the received subscriber's name in text form against a proper name dictionary file including a group of previously stored names in text and digitally encoded phoneme form, and when a match is found in said proper name file, the generating and storing step obtains the received subscriber's name in digitally encoded phoneme form from the proper name file and stores it in said system memory as the received subscriber's name.

18. A method of communicating voice mail messages between a plurality of message systems interconnected in a network, said method comprising the steps of:

storing, at a first message system, digitally encoded phonemes identifying each subscriber of said first message service system;

transmitting a voice mail message from a subscriber sender at said first message system to a recipient at a second message system, said voice mail message including a sender identification message comprising a group of said stored digitally encoded phonemes to identify said sender;

indicating at a recipient's station set at said second message system the receipt of said voice mail message; and forming, at said second message system, in response to a message retrieval request from said recipient, a system voice announcement including said sender identification message in synthetic voice generated from the group of said stored digitally encoded phonemes received in said voice mail message.

19. The method of claim 18 including the steps of:

storing, in digital signal form, a plurality of pre-recorded voice phrases at said second message service system; and wherein said voice mail message further includes a code identifying at least one of said plurality of pre-recorded voice phrases; and wherein said forming step includes the step of accessing said at least one of said plurality of pre-recorded voice phrases using said code and combining said accessed at least one of said plurality of pre-recorded voice phrases with said sender identification message to form said system voice announcement.

20. The method of claim 18 further including the step of encoding in digital format a voice message received from said sender and wherein the transmitting step includes said sender voice message in said voice mail message.

21. The method of claim 18 wherein the voice mail message includes the sender's name in digitally encoded text form.

22. The method of claim 18 wherein the voice mail message includes the sender's telephone number.

* * * * *